United States Patent [19]

Womack

[11] 4,050,835

[45] Sept. 27, 1977

[54] HYDRAULIC TAPPING APPARATUS

[75] Inventor: Robert C. Womack, Dallas, Tex.

[73] Assignee: AAA Products International Inc., Dallas, Tex.

[21] Appl. No.: 654,179

[22] Filed: Feb. 2, 1976

[51] Int. Cl.[2] .......................... B23G 1/00; B23B 47/00

[52] U.S. Cl. .......................................... 408/11; 408/10; 408/129; 408/137

[58] Field of Search ............... 408/137, 141, 142, 129, 408/11, 10, 9; 10/129 P, 130 R, 135 N; 173/4, 11

[56] References Cited

U.S. PATENT DOCUMENTS

| | | | |
|---|---|---|---|
| 818,993 | 4/1906 | Barr | 279/46 |
| 1,681,326 | 8/1928 | De Leeuw | 408/141 X |
| 1,998,275 | 4/1935 | Emrick | 10/130 X |
| 2,580,061 | 12/1951 | Adams | 408/11 X |
| 2,869,153 | 1/1959 | Capek et al. | 408/137 |
| 3,051,023 | 8/1962 | Hirsch | 408/11 |
| 3,123,847 | 3/1964 | Willis et al. | 408/9 |
| 3,200,425 | 8/1965 | Vickers | 408/9 |
| 3,661,470 | 5/1972 | O'Pry | 408/137 |
| 3,690,782 | 9/1972 | Petroff | 408/137 X |

*Primary Examiner*—Ronald J. Shore
*Assistant Examiner*—William R. Briggs
*Attorney, Agent, or Firm*—Peter J. Murphy

[57] ABSTRACT

Apparatus for heavy duty tapping operations includes a compact, lightweight, hydraulic tool unit and a remote hydraulic power unit, with the entire apparatus being designed for portability. The tool unit includes an elongated housing having a high torque, low speed hydraulic motor with internal reduction gearing, for directly driving a spindle supported in the housing for rotation and longitudinal movement. The spindle includes a lead screw coacting with a lead nut mounted at the spindle end of the housing. The spindle is directly driven by the motor drive shaft through a spline drive coupling; and the spindle is fully supported by the lead nut and drive coupling. Reversing and stop control devices control the tapping and retracting limits of movement of the spindle; and the design provides for minimum damage to the tool unit in the event of failure of the reversing or stop control devices. The remote power unit includes a reservoir for hydraulic fluid, a hydraulic pump and electric drive motor, reversing valve, and electric controls for operating the tool unit.

10 Claims, 9 Drawing Figures

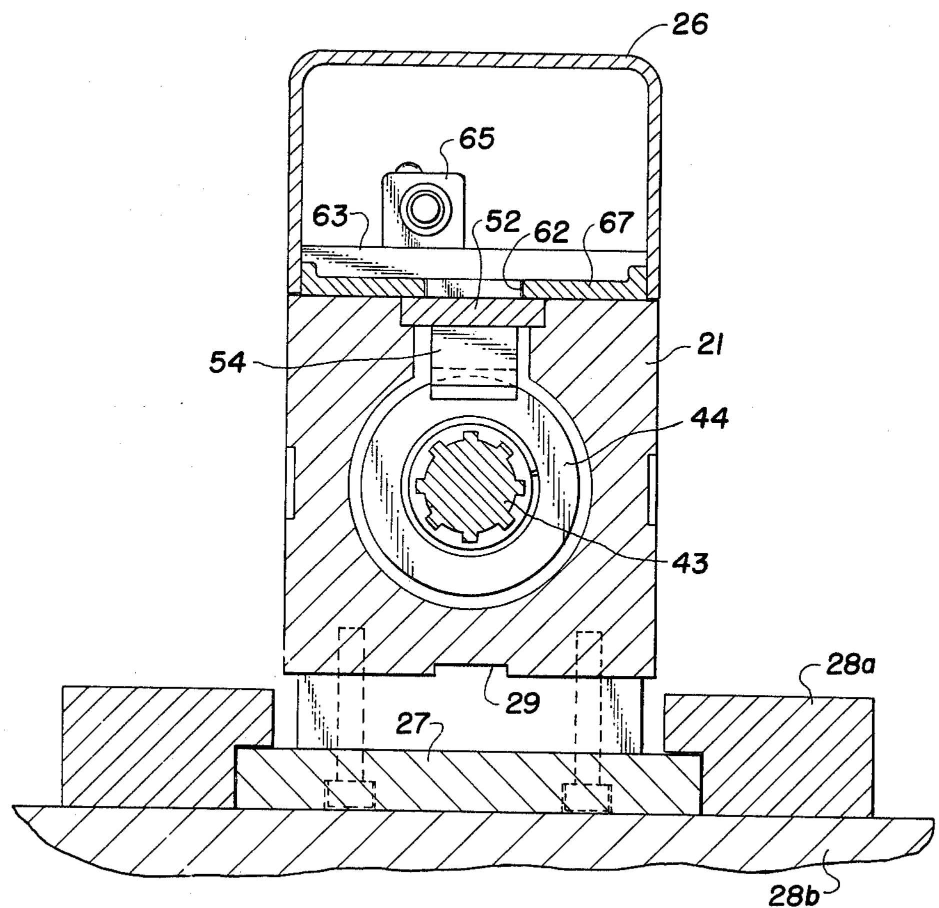
Fig. 3
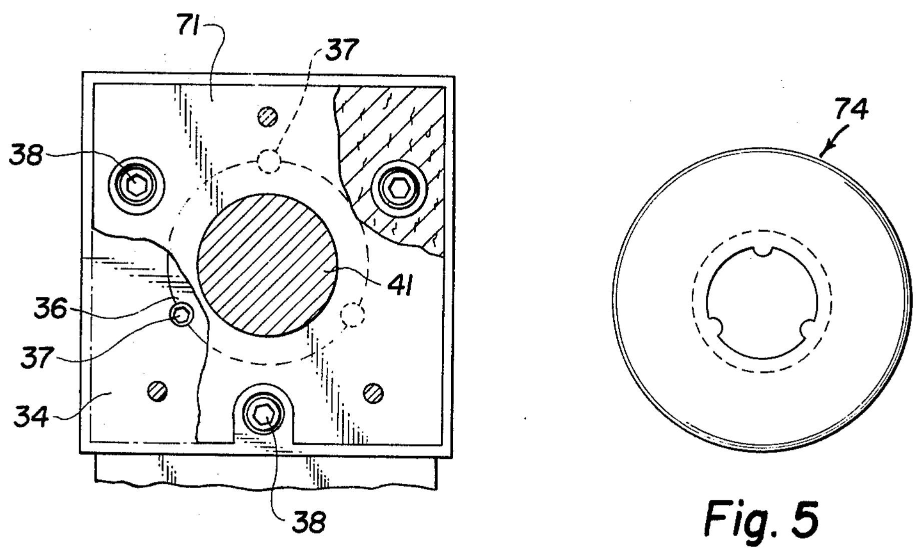
Fig. 4
Fig. 5

HYDRAULIC TAPPING APPARATUS

BACKGROUND AND SUMMARY OF THE INVENTION

This invention relates to portable heavy duty tapping apparatus; and more particularly to such apparatus including a compact, lightweight, lead screw tapping tool unit with integrally attached hydraulic motor, powered by a remote hydraulic power unit.

An object of this invention is to provide improved tapping apparatus for heavy duty tapping operations, which includes a compact lightweight tool unit with integrally attached hydraulic motor, the tool unit being powered from a remote hydraulic power unit.

Another object of this invention is to provide such apparatus which is designed for ready portability and for ready set up at a job site location.

A further object of this invention is to provide such apparatus where the hydraulic motor is a high speed, low torque motor with internal gearing, for direct drive of the tool unit tapping spindle.

Still another object of this invention is to provide such apparatus, including a heavy duty high torque tapping tool unit, which is simple in construction and economic to manufacture.

A still further object of this invention is to provide such apparatus including a tool unit with a lead screw feed of the tap, and which is designed to prevent more than minimal damage to the tool unit in the event of control failure.

Another object of this invention is to provide such apparatus including a compact lightweight tool unit capable of tapping holes up to two inches in diameter.

A further object of this invention is to provide such apparatus including a tool unit adapted for use with a multiple tap head.

Still another object of this invention is to provide such apparatus including a lead screw tool unit designed for ready changeability of the lead screw spindle and lead nut assembly for adapting the tool for use with taps of different leads.

These objects are accomplished in apparatus wherein the tool unit comprises broadly an elongated housing, including an elongated body having a motor end and a spindle end, with ths housing body having external means for indexing the housing relative to a supporting jig or fixture. A reversible hydraulic motor is mounted at the body motor end, with its drive shaft extending axially into the body; and a lead nut is nonrotatably mounted at the spindle end of the body. A spindle has a lead screw intermediate its ends for coaction with the lead nut, has means for mounting the tap at its outer end, and has spline means at its inner end. The motor shaft includes drive spline means for coupling with the spindle spline means; and the motor drive spline means and the lead nut support the spindle for rotation and for longitudinal movement relative to the housing. The housing has means defining an elongated guideway extending parallel to the rotational axis of the spindle; and a control carriage is supported in the housing guideway for rectilinear movement therealong. Coupling means couples the control carriage to the spindle for simultaneous longitudinal movement. A reversing control device and a stop control device are mounted in longitudinally spaced relation on the housing; and the control carriage carries adjustable actuators for engaging and actuating these reversing and stop control devices.

More particularly, the spline drive means are designed for runout disengagement, before the spindle and control carriage reach the limits of feed movement relative to the housing. The lead nut is designed for demounting from the housing with minimal damage, in the event of excessive force urging said lead nut out of said housing.

The novel features and the advantages of the invention, as well as additional objects thereof, will be understood more fully from the following description when read in connection with the accompanying drawings.

DRAWINGS

FIG. 3 is a transverse sectional view of a tool unit, taken in the plane 3—3 of FIG. 2;

FIG. 4 is a transverse view of the tool unit of FIG. 2 taken in the plane 4—4 of FIG. 2;

FIG. 5 is a face view of a chip guard, separated from the tool unit of FIG. 2;

DESCRIPTION OF THE PREFERRED EMBODIMENT

Figure 1:
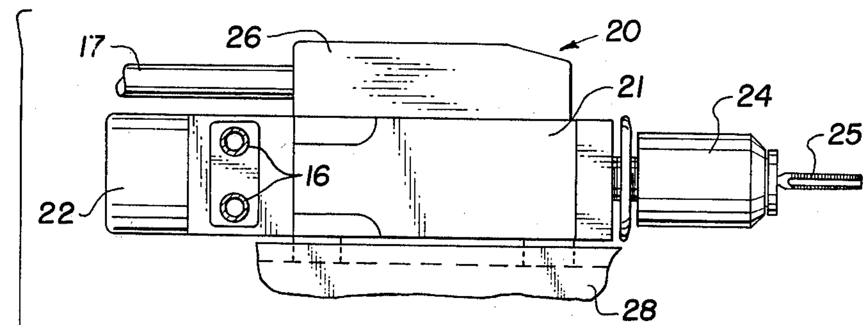
FIG. 1 is a diagrammatic illustration of apparatus embodying the invention, including a tool unit and interconnected power unit.

FIG. 1 illustrates a portable hydraulic tapping apparatus or system consisting of a power unit 10 and a tool unit 20. The apparatus or system is portable in the sense that it can be readily transported to a job site and readily moved about from one location to another at the job site, or at a fabrication plant. The power unit may consist for example of a support base 11 including support wheels and a tow bar, supporting a reservoir 12 for hydraulic fluid, with the reservoir structure supporting a pump 13, an electric drive motor 14 and a control unit 15. The control unit 15 controls the flow of hydraulic fluid to and from the pump and reservoir on the one hand and to and from the two unit motor on the other hand through a pair of hydraulic hoses 16; and an electric conduit 17 connected between the control unit and the tool unit carries electron control inductors as will be described. The control unit 15, as will be described in detail subsequently, includes a four-way, double solenoid operated, hydraulic valve which serves to pressurize alternatively one or the other of the hydraulic hoses to effect drive of the tool unit motor in one direction or the other respectively, with the remaining hose defining the return line to the reservoir. The hydraulic valve is electrically controlled, as will be described.

The tool unit 20 is designed to be lightweight and compact, to facilitate its portability and its use in tapping situations where space limitations are tight. As seen in FIG. 1 the tool unit consists of a main housing including an elongated body 21, a reversible hydraulic motor 22 mounted at what is referred to as a motor end of the body 21, a spindle 23 projecting from the spindle end of the housing and carrying a tap bushing adaptor 24 and tap-bushing assembly 25. A housing cover 26 encloses control switches to be described. A slide plate 27 is mounted on one face of the body 21 for the purpose of mounting the tool unit to a suitable box slide 28 if that is desired. A box slide is illustrated by rails 28*a* secured to a base 28*b*.

Figure 2:
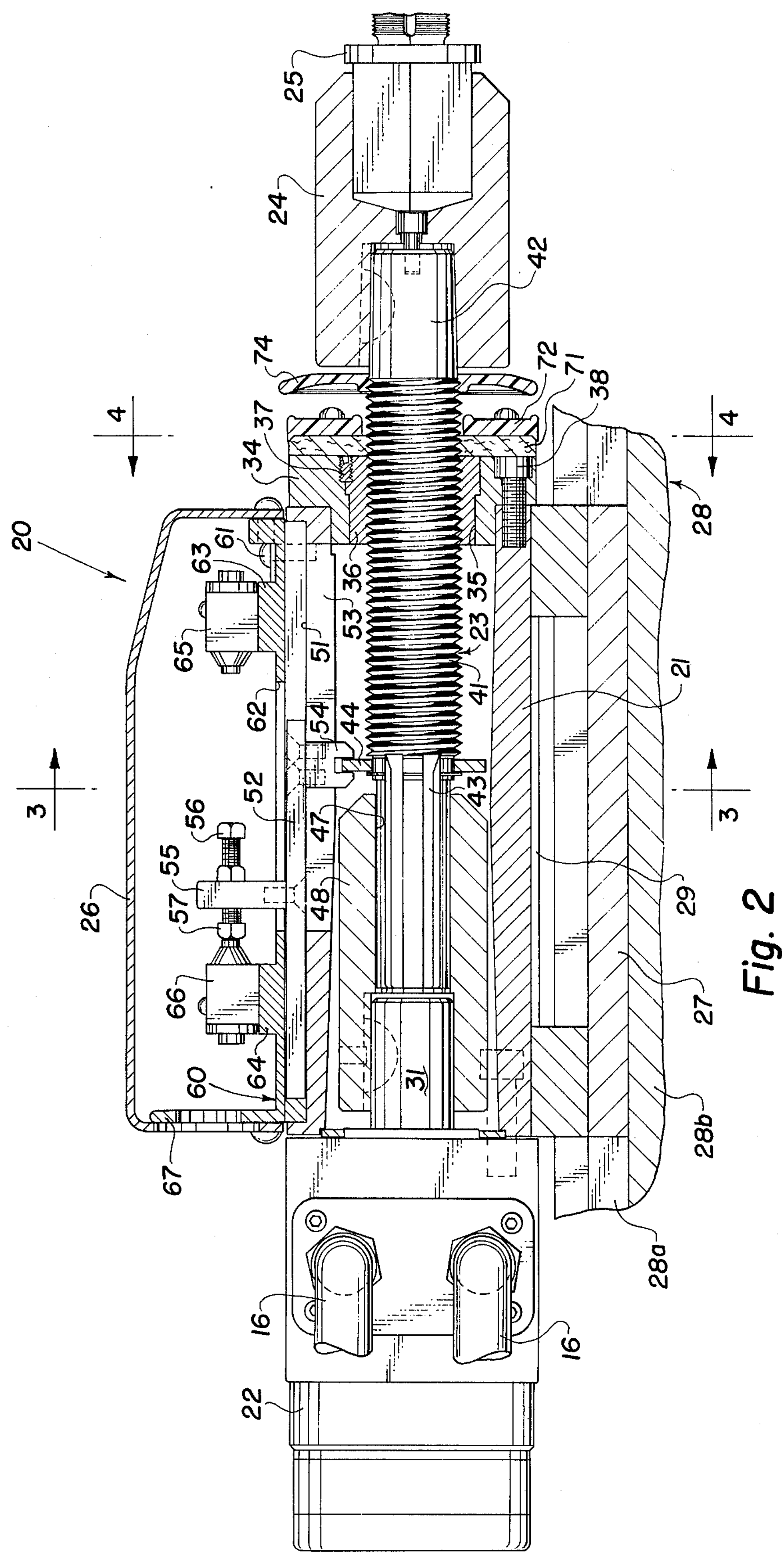
FIG. 2 is a longitudinal sectional view of the tool unit illustrated in FIG. 1.

By way of example of size and capacity, such a tool unit 20 carrying a 7½ horsepower hydraulic motor may weigh in the range of 20 to 25 lbs., where the housing body is fabricated of die cast aluminum and where other parts are fabricated from steel or other suitable materials. For this tool unit, to be described in detail below, the overall length of the housing may be about 9 inches with the main housing body being about 3¼ inch square. The hydraulic motor being generally cylindrical in configuration may have an outer diameter of about 3¼ inches. It will be seen then that the tool unit may be quite slim, with the housing cover 26 presenting a protrusion on one side only. Referring now particularly to FIGS. 2 and 3, it will be seen further that the housing body includes a longitudinal indexing groove 29 in one wall, which coacts with an index rib 30 provided in the slide plate 27 for the purpose of indexing or aligning the tool unit relative to the slide plate, or for indexing the tool unit relative to another fixture in applications where a box slide 27 may not be used.

The motor 22 is preferably a high torque, low speed motor unit having built in gear reduction, wherein the motor is used in direct drive with the spindle 23 to produce spindle speeds of 25 to 900 rpm; and wherein the tool unit is capable of tapping operations employing ¼ to 2 inch taps. If desired the output speed of the spindle can be further reduced by throttling the flow of hydraulic fluid to the hydraulic motor.

The housing body is shown with recesses accommodating cap screws for securing the motor 22 in axial alignment with the housing body, with the motor drive shaft 31 projecting into the interior of the housing body and coinciding with the longitudinal central axis of that body. A steel housing end cap 34 is secured to the spindle end of the body 21, by means of suitable cap screws threaded through suitable counterbores in the end cap and into the body. This end cap is provided with a counterbored through bore 35, and defines a housing for an internally threaded bronze bushing 36 which functions as the lead nut for the tool unit as will be described. The lead nut 36 is seated within the housing counterbore 35 with an interference fit; and is further retained in ths housing by means of one-fourth inch allen set shear screws, threaded into tapped holes provided in the face of the end cap assembly, with the tapped holes being drilled and tapped into the joint between the housing bushing and the lead nut. This mounting provides for separation of the lead nut from the bushing housing as will be described.

The spindle 23 includes three portions namely: an intermediate lead screw portion 41 threadedly engaged with the lead nut 36, an outer end taper 42, and an external spline 43 at its interior end. The spindle spline 43 is received in the mating internal drive spline 47 of a drive sleeve 48, which sleeve is also received over the motor drive shaft 31 and keyed thereto by means of a Woodruff key. The drive sleeve 48, then, is rotationally and axially fixed to the motor drive shaft 31. It will now be seen that the spindle 23 is supported within the housing along a central axis, for both rotation and axial movement, by means of the lead nut 36 and the drive spline 47. The spindle assembly also includes a coupling flange 44 in the form of an annular disk secured thereto between the lead screw and the spline by means of a suitable retaining ring. At its outer end, the spindle taper 42 has a tap bushing adaptor 24 secured thereto by means of a Woodruff key; and this in turn supports a suitable tap bushing and tap assembly 25. Alternatively the motor drive spline could be an external spline coacting with an internal spline associated with the spindle.

Referring now to the means for controlling the longitudinal movements of the spindle, the housing body is provided with a guideway 51 in the form of a longitudinal groove formed in the exterior top wall of the body. The groove 51 is parallel with the spindle axis and defines a sliding guideway for an elongated rectangular slide bar which defines a control carriage 52. An opening 53 in the housing wall communicates the guideway 51 with the interior of the body, and accommodates a bifurcated coupling dog 54 fixed to the inner face of the carriage bar 52 and projecting into the housing for receiving the periphery of the coupling flange 44; and the slide bar is therefore longitudinally coupled to the spindle 23. The control carriage assembly further includes an actuator bracket 55 projecting outwardly from the housing body and carrying a pair of adjustable actuators 56 and 57 which are in the form of cap screws and lock nuts threaded into suitable threaded holes in the actuator bracket.

The tool unit housing further includes a mounting plate 60 which is secured to the housing body 21 by suitable round head screws 61 for example, and which substantially overlies the upper wall of the body 21 particularly serving to close the guideway groove 51 for the slide bar. This mounting plate is provided with a central elongated wall opening 62 through which the actuator bracket 55 projects permitting longitudinal movement of the slide bar and associated actuator bracket. At the opposite ends of this opening, are mounting pedestals 63 and 64 for supporting respectively a reversing microswitch 65 and a shutoff microswitch 66. As seen in the drawings, the reversing microswitch is engaged and actuated by the adjustable actuator 56 while the shut off microswitch is engaged and actuated by the adjustable actuator 57. The mounting plate 60 further includes an end wall 67 provided with a suitable aperture for the mounting of flexible conduit for the electric control conductors connected to the switches. The housing cover 26 encloses and protects the microswitches and the associated structure.

Referring now to the spindle end of the tool unit housing, the threads of the lead nut and lead screw are protected and lubricated by means of a felt washer 71 which overlies the assembly of the lead nut and bushing housing. The washer is retained in engagement with the lead screw threads by a plastic retainer. One aspect of this structure, best seen in FIG. 4, is that the felt washer and plastic retainer are provided with suitable openings aligned with the heads of the cap screws 38 which secure the end cap 34 to the housing body 21. The purpose of this is to permit ready removal of the spindle assembly which assembly includes the spindle 23, and the end cap 34, lead nut 36, felt washer 71 and retainer 72. To remove this assembly, for the purpose of inserting a substitute assembly of different lead for example, it is only necessary to remove these cap screws 38, to remove the housing cover 26, and to loosen the round head screws 61 securing the mounting plate 60 to the housing body 21 for the purpose of disengaging the carriage coupling dog 54 from the disk 44. By reversing these operations, a new spindle assembly is installed; and this entire exchange operation can be done very quickly and while the tool is at the job site and perhaps mounted on a supporting fixture.

Figure 6:
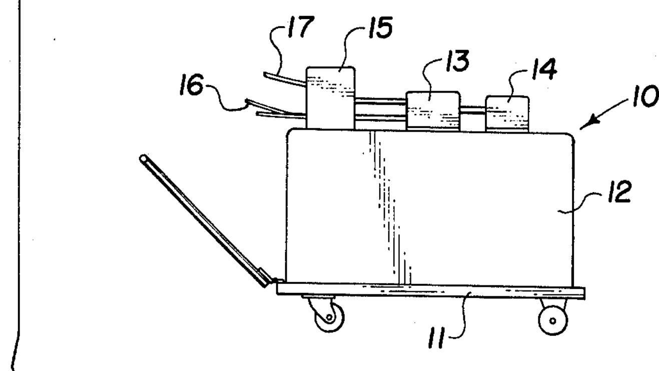
FIG. 6 is a side elevation view of the tool unit of FIG. 2, partially broken away to show relative positions of components when the spindle is fully extended.
Figure 6:
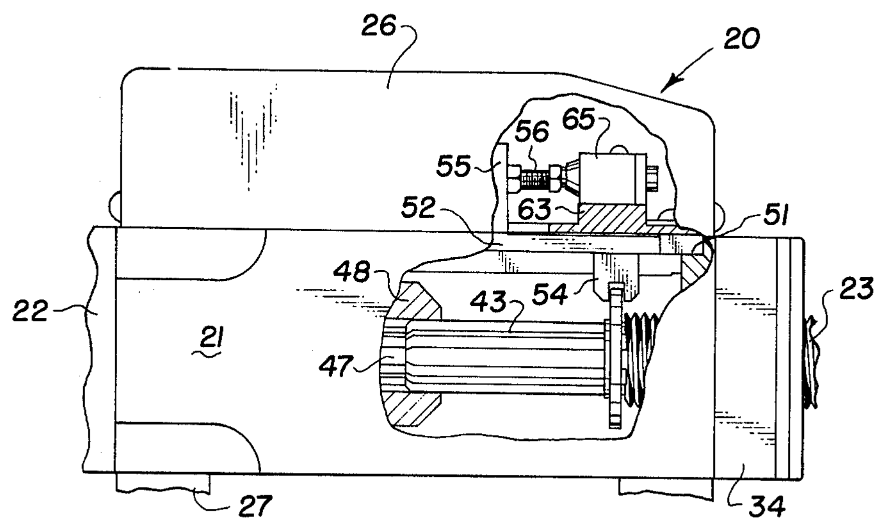

Another feature of the tool unit is a chip guard 74 consisting of an annular disk-like member best seen in FIG. 2 and illustrated separately in FIG. 5. This chip guard is preferably fabricated from a suitable plastic material having a central hub by means of which it is secured to the spindle lead screw. A single size of chip guard may be used with spindle assemblies having a common outer thread diameter, but of different leads; and the structure for accommodating this is particularly seen in FIG. 6 wherein the hub has an internal bore diameter corresponding to the outer diameter of the spindle thread, and has three inward directed bosses which would interfere with the thread making the hub therefore self-threading on the lead screw. In this manner the chip guard is securely retained on the spindle. This chip guard serves for overhead tapping to prevent metal chips from gathering on the spindle end of the housing and possibly working themselves between the threads of the lead nut and lead screw.

Another safety feature is that the housing may be provided with suitable openings to drain hydraulic fluid which may leak into the housing through motor shaft seals.

Figure 7:
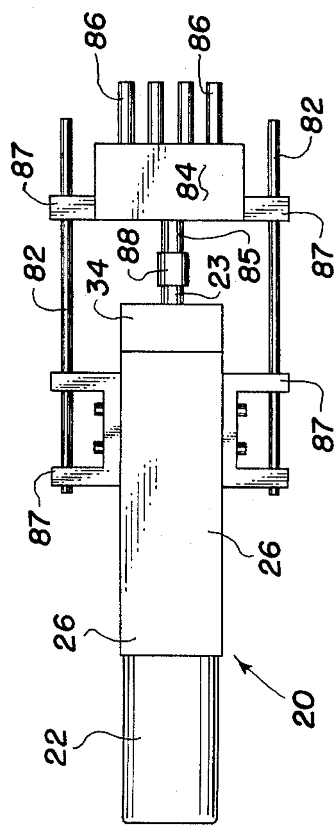
FIG. 7 is a plan view of a modified form of tool unit with a multiple tap head.

FIG. 7 illustrates the above described tool unit 20, modified for use with a multiple tap driving head. FIG. 7 is a top view of the unit showing the housing cover 26, the hydraulic motor 22, the end cap 34 and spindle 23. Mounted on opposite sides of the housing body 21 are U-shaped brackets 81 for supporting elongated guide rods 82 which extend forwardly from the housing parallel with the spindle axis. A multi-tap drive head 84 includes an input shaft 85 and spindles for driving four taps 86; and this head includes lateral ears 87 carrying suitable bushings or bearings for guiding reciprocating movement of the head on the guide rods 82. The head is rotatably and axially coupled to the spindle 23 by means of a suitable coupler 88. It will be seen that the overall width of this tool unit is determined by the necessary width of the tap driving head and associated guide system.

Operation

Figure 8:
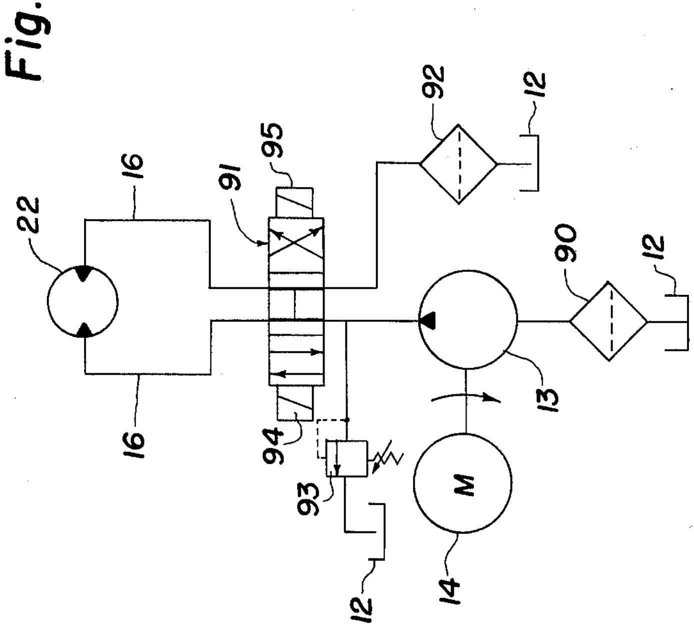
FIG. 8 is a schematic diagram of a hydraulic operating circuit for the apparatus of the invention.

The operation of the tapping apparatus will now be described in connection with hydraulic and electric circuits and components which are illustrated schematically in FIGS. 8 and 9. Referring to the hydraulic control circuit of FIG. 8, the pump 13 driven by an electric motor 14 withdraws hydraulic fluid from the reservoir 12 through a strainer 90; and directs pressurized fluid to a four-way hydraulic valve 91 which controls the flow of fluid to and from the hydraulic motor 22 through the hoses 16 and 17. The illustrated hydraulic valve is a double solenoid actuated, spring centered, three-position valve controlled by the electric control circuit to be described. In the operation of the apparatus, the hydraulic pump 13 is operated continuously; and in the center position of the valve the circulating fluid is bypassed through the valve to the reservoir through a filter 92, and is not directed to the motor 22. This hydraulic system also includes a bypass relief valve 93 for bypassing fluid to the reservoir, to limit the torque applied to small taps for preventing tap breakage, and in the event of system malfunction. The valve 91 includes a feed solenoid 94 and a retract solenoid 95 which function respectively to shift the valve for the feed and retract strokes of the spindle.

Figure 9:
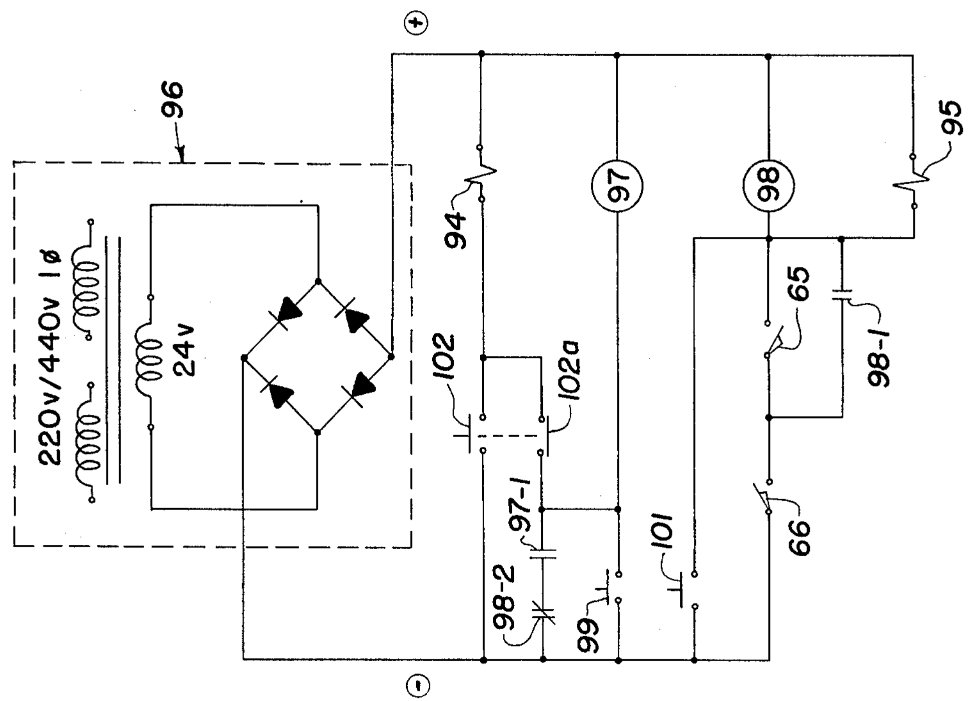
FIG. 9 is a schematic diagram of an electric operating circuit for the apparatus of the invention.

Referring now to the electric control circuit of FIG. 9, this control circuitry with the exception of the reversing and shutoff switches 65 and 66 may be mounted in the control unit 15 along with the hydraulic valve 91. This circuit includes a power supply 96 which in turn includes a transformer for converting 220 volt or 440 volt single phase AC power to a 24 volt DC control system through a diode bridge rectifier.

The feed solenoid coil 94 is connected in parallel with the coil of an electric feed relay 97 which includes associated normally open contacts 97-1. Contacts 97-1 and normally closed contacts 98-2 are connected in series with each other, and in parallel with a normally open push button start switch 99; and this last described parallel circuit is connected in series with the parallel circuit of the feed solenoid and relay coil.

To initiate the feed stroke, start switch 99 is closed and this energizes both the feed solenoid and feed relay to close the relay contacts 97-1. The feed solenoid and feed relay are then maintained energized through the circuit including the contacts 97-1 and 98-2. The hydraulic valve 91 then shifts to the feed condition and is maintained in this condition until the solenoid 94 is deenergized.

The return circuit includes the solenoid 95 and the coil 98 of an electric retract relay which are connected in parallel; and normally open relay contacts 98-1 and normally closed relay contacts 98-2 are associated with the retract relay. The control circuit for the coils 95 and 98 includes a parallel circuit consisting of the contcts 98-1 and the normally open reversing switch 65, which parallel circuit is connected in series with the parallel circuit of the coils 95 and 98. The shutoff switch 66 is connected in series with the parallel circuit of the contacts 98-1 and reversing switch 65; and this shutoff switch, while electrically connected as normally closed, is illustrated as normally open since it is normally held in the open condition by the actuator 57 of the control carriage when the tool is in the rest condition. As soon as the feed movement of the spindle 23 begins, this shutoff switch closes.

Referring now to the retract cycle, when the spindle reaches its forward limit the reversing switch 65 is engaged and closed momentarily by its actuator 56. Since the shutoff switch 66 is then closed, the retract solenoid 95 and retract relay 98 are energized through the series connected reversing and shutoff switches; and this effects the closing of the relay contacts 98-1 and the opening of the relay contacts 98-2. The opening of the contacts 98-2 deenergizes both the feed solenoid 94 and the feed relay 97. Simultaneously the energizing of the retract solenoid 95 effects shifting of the valve 91 to reverse the hydraulic motor and effect retraction of the spindle; and the retract solenoid and retract relay coil are maintained energized through the series connected relay contacts 98-1 and shutoff switch 66. The reversing switch will of course again open as soon as its actuator 56 retracts from the reversing switch. At the limit of retracting movement of the spindle, the shutoff switch is opened by its associated actuator 57 to deenergize the retract solenoid 95 and the retract relay 98. The valve 91 is then returned to its center position by its centering springs, and the tool unit is back at a rest condition for initiation of a succeeding tapping cycle.

An additional circuit feature is the emergency retract switch 101, which is a normally open pushbutton switch connected in series with the parallel connected retract solenoid 95 and the retract relay 98. The closing of this switch manually immediately initiates the retract cycle, regardless of the position of the spindle, controlling the circuit in the same manner as the reversing switch 65. Another feature of the circuit is a jog feed switch 102 which is a normally open pushbutton switch. This switch energizes the feed solenoid 94 when it is closed; and the switch includes associated contacts 102*a* which remove the feed relay 97 from the circuit for this operation. This jog feed switch is used for setting up the tapping depth for the tool unit.

The tool unit has certain safety features built into it which prevent damage to the tool unit in the event of failure of the controlling microswitches. The limit of feed movement of the spindle and the control carriage is of course determined by the physical dimensions. As best seen in FIG. 2, the spindle must be reversed before the coupling flange 44 engages the inner face of the end cap 34, and before the control carriage engages the end of the guideway. It will be seen from FIG. 6 that the reversing switch 65 is engaged by the adjustable actuator 56 before these limits are reached. It will also be seen from FIG. 6 that, at the moment of engagement of the reversing microswitch 65, the trailing end of the spindle spline 43 is about to run out on the drive spline 47. The parts of the tool unit are actually dimensioned so that this runout will occur before the spindle or carriage reach their forward limits as above described. In the event of failure of the reversing switch 65 then the actuator 56 would likely displace the microswitch 65 from its pedestal, but further advance of the spindle and conrol bar would cease before any serious damage was done to the housing or other structural parts. This safety feature would also come into play should the reversing microswitch be overridden, either deliberately or through some careless or unintentional operation of the tool unit.

For the reversing stroke, the tool unit also provides a safety feature in the event of failure of the shutoff microswitch 66. This feature consists in part of the relative positions of the confronting ends of the motor drive shaft 31 and the spindle 23 at the moment of engagement of the microswitch 66 by the actuator 57, these ends being close to abutment. Should the shutoff microswitch fail to shut off the tool, the spindle will move into abutment with the motor drive shaft 31. Continued rotational drive of the spindle will effect pressure buildup in the hydraulic pressure line; and if hydraulic relief valves are appropriately set, these may be operative to prevent further drive of the motor and damage to the tool.

Should the tool unit be set for high torque such that the pressure relief valve would not be effective, the continued rotation of the spindle would have the effect of seeking to drive the lead nut 36 out of the end cap 34. This can occur since the set screws 37 or mating threads will be stripped out in response to a predetermined axial force allowing, the lead nut to be displaced from the end cap. This presents minimal damage to the tool unit, in that the spindle assembly can then be repaired by replacing the lead nut in the end cap, then reboring and retapping suitable holes for the allen set screws, and replacing the felt washer and its retainer.

In regard to the mounting of the tool unit 20, the body index groove 28 provides means for accurately indexing the unit relative to permanent jigs or fixtures for applications where it is not necessary that the tool housing move during the tapping operation. In the illustrated tool unit, this indexing groove 29 is used to index the housing relative to a mounting base which is in the form of a slide plate 27 for coacting sliding engagement with a box slide 28, which may be a part of a mounting jig or fixture or may be fabricated at the job site. Such a mounting would be desired where it is necessary to advance and retract the tool unit relative to the work piece, in addition to the feeding and retracting of the tool spindle. For this purpose a double acting air or hydraulic feed cylinder may be mounted to operate between the slide plate 27 and the box slide 28 structure, to make this advancing and retracting of the tool unit a remote operation. Alternatively, the tool unit and its associated slide plate may be moved manually; and the tool unit may be retained against reverse movement in the box slide by means of a suitable retaining pin dropped into a suitable aperture in the box slide.

Desirably, quick disconnect hydraulic hoses and electric conduits may be provided for coupling tool units to one or more power units.

Summary

What has been described is an improved hydraulic tapping apparatus which incorporates a unique tool unit which is lightweight and compact, yet has torque capability for the tapping of a single hole up to 2 inches in diameter or having torque capability for the tapping simultaneously a plurality of smaller holes with a multiple tapping head. The apparatus is very portable, and particularly adapted for use in situations where the tapping tool is taken to a job site as opposed to the bringing of a job to a fabrication plant. Because of the compactness of the tool units, a plurality of tool units may be mounted in close proximity to each other to tap simultaneously a plurality of large sized holes; with the power unit being designed to have sufficient power to drive a predetermined number of the tool units at full torque capacity.

Particular features of the tool units is that they are very simple in construction, powerful, rugged, and safe. The tool units are designed for remote control operation having automatic controls for reversing the spindle feed at the end of the tapping stroke and shutting off the tool at the end of the cycle, with the internal parts of the tool unit being designed that minimum damage to the tool will occur should the reversing or stop controls fail to function for any reason.

The tool unit is designed for automatic feeding and retracting of the drive spindle which carries a tap; and the tool unit is designed for accurate indexing to a supporting jig or fixture, including a box slide or dovetail slide assembly whereby the tool unit may be moved to and from confronting relation with the work piece prior to operation of the tool tapping cycle. Such mounting may be desirable in certain instances; and the mounting structure is readily adapted for manually positioning the tool unit on its supporting slide, or for remotely positioning the tool unit relative to its supporting slide by means of an air cylinder or other remotely controllable reciprocating drive motor.

Because of its lightweight and size and its adaptability to preliminary feed by means of a mounting slide, the tool is readily adaptable for use in tapping areas on a work piece which are difficult of access.

Because of its convenient size and weight, and high torque capacity relative to size and weight, the tool units are also readily adapted for use in fabrication operations on a production line wherein the work pieces are fed sequentially to a work station for successive operations, or wherein a number of operating tools are mounted on a rotary table for sequential operations on a work piece at a single work station. Because of the compact size, a plurality of tool units may be mounted side-by-side for simultaneous multiple tapping of large size holes, thereby performing in a single operation what would normally require several separate tapping operations. For smaller holes this efficiency can be achieved by a single tool unit driving a multiple tapping head, with the single tool unit having adequate torque for the multiple tapping operation and again performing, in a single operating step, what might otherwise require multiple operations.

A feature and advantage is the use of a low speed high torque hydraulic motor in a tapping unit for the performing of many and varied heavy duty tapping functions, thereby enabling the performing of these functions with apparatus which is relatively inexpensive and therefore efficient in use; and representing efficiency from the standpoint of time and labor in that the apparatus is readily set up for many different operations.

While the preferred embodiment of the invention has been illustrated and described, it will be understood by those skilled in the art that changes and modifications may be resorted to without departing from the spirit and scope of the invention.

I claim:

1. Hydraulic tapping apparatus comprising an elongated housing, including an elongated body having a motor end and a spindle end; said housing body having external means for indexing said housing relative to a supporting fixture; and a reversible hydraulic motor mounted at said body motor end, with its drive shaft extending axially into said body; a lead nut nonrotatably mounted at said body spindle end;

a spindle having a lead screw intermediate its ends for coaction with said lead nut, having means for mounting a tap at its outer end, and having spline means at its inner end;

said motor shaft including drive spline means for coupling with said spindle spline means;

said lead nut and said motor shaft supporting said spindle for rotation and for longitudinal movement relative to said housing;

said housing having means defining an elongated guideway extending parallel to the rotational axis of said spindle;

a control carriage supported in said guideway for rectilinear movement therealong; means coupling said control carriage to said spindle for simultaneous longitudinal movement;

a reversing control device and stop control device mounted in longitudinally spaced relation on said housing; and adjustable actuators mounted on said control carriage for engaging and actuating said reversing and stop control devices;

said drive spline being axially and rotationally fixed to said motor shaft;

said housing guideway, said lead nut, said control carriage, and said spindle-to-carriage coupling means, all being disposed relative to each other to allow limited additional longitudinal movement of said spindle and carriage in a direction toward the spindle end of said housing, following engagement of an adjustable actuator with said reversing control device; said drive spline and said spindle spline having relative dimensions that said spindle spline will disengage from said drive spline before said spindle and carriage exceed said additional longitudinal movement toward the housing spindle end, thereby preventing damage to said apparatus in the event of failure of said reversing control device.

2. Tapping apparatus as set forth in claim 1 further comprising said lead nut and said motor drive spline defining the sole support for said spindle;

3. Tapping apparatus as set forth in claim 1 further comprising said stop control device determining the normal limit of spindle movement toward the motor end of said housing;

said motor drive shaft, said spindle, said control carriage and said stop control device being positioned, relative to each other, that the inner end of said spindle moves to substantial abutting relation with the distal end of said motor drive shaft when the respective adjustable actuator engages said stop control device, whereby said motor drive shaft provides a physical barrier to significant additional longitudinal movement of said spindle.

4. Tapping apparatus as set forth in claim 1 further comprising said spindle having means defining a radially projecting flange;

said tool housing having means defining an elongated opening communicating said guideway with the interior of said tool housing; said control carriage including a dog projecting through said housing elongated opening, for coupling said control carriage to said spindle flange for corresponding longitudinal movement.

5. Tapping apparatus as set forth in claim 3 further comprising hydraulic fluid conduits for attachment to said hydraulic motor, for coupling said motor to a remote power unit including an electrically operated reversing control valve;

said reversing control device and said stop control device each comprising an electric switch for controlling said remote unit control valve.

6. Tapping apparatus as set forth in claim 3 including a remote power unit comprising a hydraulic reservoir, a motor driven hydraulic pump, conduits for conveying hydraulic fluid between said power unit and said tool unit hydraulic motor, and an electrically operated reversing valve connected in said conduits for reversing the flow of hydraulic fluid to and from said motor;

and said tool unit reversing control device and stop control device each comprising an electric switch for controlling said control valve.

7. Hydraulic tapping apparatus comprising an elongated housing, including an elongated body having a motor end and a spindle end; said housing body having external means for indexing said housing relative to a supporting fixture; and a reversible hydraulic motor mounted at said body motor end, with its drive shaft extending axially into said body; a lead nut nonrotatably mounted at said body spindle end;

a spindle having a lead screw intermediate its ends for coaction with said lead nut, having means for mounting a tap at its outer end, and having spline means at its inner end;

said motor shaft including drive spline means for coupling with said spindle spline means;

said lead nut and said motor shaft supporting said spindle for rotation and for longitudinal movement relative to said housing;

said housing having means defining an elongated guideway extending parallel to the rotational axis of said spindle;

a control carriage supported in said guideway for rectilinear movement therealong; means coupling said control carriage to said spindle for simultaneous longitudinal movement;

a reversing control device and stop control device mounted in longitudinally spaced relation on said housing; and adjustable actuators mounted on said control carriage for engaging and actuating said reversing and stop control devices;

said housing guideway being defined by an elongated groove formed in an outer wall surface of said housing body; an elongated slot in said groove wall communicating said groove with the interior of said housing body;

said control carriage comprising an elongated slide bar dimensioned to be received in said groove for rectilinear movement therein; a dog mounted on the inner face of said slide bar, extending through housing slot for coupling engagement with said spindle, defining said means coupling said control carriage to said spindle;

an actuator bracket mounted on the opposite face of said slide bar for carrying said adjustable actuators.

8. Tapping apparatus as set forth in claim 7 further comprising an elongated mounting plate secured to said housing body, and overlying said guideway groove for confining said slide bar within said groove; said mounting plate having an elongated slot through which said actuator bracket projects;

said mounting plate including means for mounting said two control devices adjacent opposite ends of said mounting plate slot, for engagement by said adjustable actuators.

9. Tapping apparatus as set forth in claim 8 further comprising said spindle having means defining a radially projecting flange for coupling engagement with said carriage dog;

and said adjustable actuators comprising threaded members carried in coacting threaded bores in said actuator bracket.

10. Hydraulic tapping apparatus comprising an elongated housing, including an elongated body having a motor end and a spindle end; said housing body having external means for indexing said housing relative to a supporting fixture; and a reversible hydraulic motor mounted at said body motor end, with its drive shaft extending axially into said body; a lead nut nonrotatably mounted at said body spindle end;

a spindle having a lead screw intermediate its ends for coaction with said lead nut, having means for mounting a tap at its outer end, and having spline means at its inner end;

said motor shaft including drive spline means for coupling with said spindle spline means;

said lead nut and said motor shaft supporting said spindle for rotation and for longitudinal movement relative to said housing;

said housing having means defining an elongated guideway extending parallel to the rotational axis of said spindle;

a control carriage supported in said guideway for rectilinear movement therealong; means coupling said control carriage to said spindle for simultaneous longitudinal movement;

a reversing control device and stop control device mounted in longitudinally spaced relation on said housing; and adjustable actuators mounted on said control carriage for engaging and actuating said reversing and stop control devices;

said stop control device determining the normal limit of spindle movement toward the motor end of said housing;

said motor drive shaft and said spindle being so disposed that the inner end of said spindle moves to substantial abutting relation with the distal end of said motor drive shaft when the respective adjustable actuator engages said stop control device, whereby said motor drive shaft provides a physical barrier to significant additional longitudinal movement of said spindle;

said tool housing further including a bushing housing secured to its spindle end; said lead nut comprising an internally threaded bushing frictionally retained in said bushing housing against relative axial movement;

yieldable retaining means further coupling said lead nut bushing against axial movement relative to said bushing housing;

said yieldable means being designed to yield in response to a predetermined axial force resulting from abutting engagement of said rotating spindle with said motor drive shaft.

* * * * *

UNITED STATES PATENT OFFICE
CERTIFICATE OF CORRECTION

PATENT NO. : 4,050,835

DATED : September 27, 1977

INVENTOR(S) : Robert C. Womack

It is certified that error appears in the above-identified patent and that said Letters Patent are hereby corrected as shown below:

| | |
|---|---|
| Claim 4, line 33 | delete "said tool housing having means defining an elongated" |
| Claim 4, line 34 | delete "opening communicating said guideway with the" |
| Claim 4, line 35 | delete "interior of said tool housing;" |
| Claim 5, line 1 | change "3" to --1-- |
| Claim 6, line 1 | change "3" to --1-- |

Signed and Sealed this

*Third* Day of *January 1978*

[SEAL]

*Attest:*

RUTH C. MASON
*Attesting Officer*

LUTRELLE F. PARKER
*Acting Commissioner of Patents and Trademarks*